United States Patent [19]

Fossum

[11] Patent Number: 5,748,863
[45] Date of Patent: May 5, 1998

[54] METHOD AND SYSTEM FOR FAST INTERPOLATION OF DEPTH BUFFER VALUES IN A COMPUTER GRAPHICS DISPLAY SYSTEM

[75] Inventor: Gordon C. Fossum, Austin, Tex.

[73] Assignee: International Business Machines Corporation, Armonk, N.Y.

[21] Appl. No.: 540,359

[22] Filed: Oct. 6, 1995

[51] Int. Cl.$^6$ .................................................. G06T 15/40
[52] U.S. Cl. .................................... 395/122; 395/119
[58] Field of Search ................................. 395/122, 121, 395/119, 118

[56] References Cited

U.S. PATENT DOCUMENTS

| | | | |
|---|---|---|---|
| 4,107,773 | 8/1978 | Gilbreath et al. | 395/775 |
| 4,609,917 | 9/1986 | Shen | 395/121 |
| 4,970,499 | 11/1990 | Ryherd et al. | 395/122 |
| 5,214,753 | 5/1993 | Lee et al. | 395/125 |
| 5,341,462 | 8/1994 | Obata | 395/122 |
| 5,377,313 | 12/1994 | Scheibl | 395/122 |
| 5,493,644 | 2/1996 | Thayer et al. | 395/163 |

Primary Examiner—Phu K. Nguyen
Assistant Examiner—Cliff N. Vo
Attorney, Agent, or Firm—Volel Emile; Brian F. Russell; Andrew J. Dillon

[57] ABSTRACT

A graphics system that performs fast interpolation of depth buffer values is provided within a host data processing system that includes a host processor executing a graphics application having graphics data that includes depth data. The graphics system comprises a memory/graphics controller that converts graphics data to pixel data, wherein the memory/graphics controller includes means for receiving an initial depth buffer value from the host processor in a floating-point format having a sign bit, an exponent and a mantissa, means for generating an accumulator value from the mantissa, means for receiving a delta depth value from the host processor, means for performing an integer addition of the accumulator value to the delta depth value to produce a sum, and means for generating a floating-point depth buffer value for a display pixel from the sum, the sign bit and the exponent of the initial depth value. The host data processing system includes a graphics adapter that receives display pixel data from the controller, including a depth buffer value for each pixel, and that converts the display pixel data to output signals for driving an output display device.

32 Claims, 5 Drawing Sheets

METHOD AND SYSTEM FOR FAST INTERPOLATION OF DEPTH BUFFER VALUES IN A COMPUTER GRAPHICS DISPLAY SYSTEM

BACKGROUND OF THE INVENTION

1. Technical Field

The present invention relates in general to graphics display systems, and in particular to computer graphics display systems that perform depth buffer interpolation of 3-D images.

2. Description of the Related Art

Many computers, particularly those in the PC, microcomputer, or workstation categories, have computer graphics functionality. Computer graphics create computer-generated display images that are real or imagined, animated or still, two-dimensional (2-D) or three-dimensional (3-D).

In traditional graphical systems, image data are stored either as Cartesian coordinates or as vectors that define geometric objects such as a polygon. This data may be manipulated by a graphics processor through the geometrical transformations of scaling, translating, and rotating in a reference system known as the world coordinate system (WCS). Physical devices use their own coordinate systems known as screen coordinate systems (SCS). In order to ready the image for display, a viewing transformation takes place, which changes the image data in the WCS to its corresponding device-specific screen coordinates in SCS. A window or portion of the world picture is chosen to be shown in an area of the display known as the viewport. Because some of the data in the world could be outside this window, a clipping operation is necessary. Clipping will eliminate any data points outside the window. In 3-D imaging, the viewing transformation must also take into account the view reference point (i.e., the position from which an object is to be viewed) and the perspective projection (i.e., the conversion from the object's 3-D coordinates to the screen's 2-D coordinates).

Also taken into account in an image transformation is the relative distance or depth of an object in the world shown through the viewport. The transformation will clip data outside of user-defined limits (i.e., objects beyond the farthest/nearest distance displayed) and will not render portions of objects covered by objects having closer depth values. Thus, the use of depth values is particularly valuable in 3-D, Scientific Visualization, Computer Animation, and Digital Video applications.

Although many approaches have been used in the art to provide three-dimensional displays and which use various techniques for solving "hidden surface" and "shading" problems, one valuable approach has been to use a depth buffer, sometimes referred to as a Z-buffer. The depth buffer holds depth values which define the depth relationships among the points that form the image so that points on one portion of the image which are behind points on other portions of the image at the same display location are effectively removed. Thus, Z-buffering is a method of preventing the display of hidden edges and hidden polygons in a three-dimensional image which has been mapped onto a two-dimensional display.

Standard 3-D graphics paint a large number of polygons on the screen to construct a complicated object. The vertices of the polygon have associated coordinate values (x, y), colors (r, g, b), and depth values (z). High-end graphics adapters can take just this vertex data of these polygons and proceed to render the interiors properly with linear interpolation of the colors and the depths. While these graphics adapters provide high performance, they are prohibitively expensive for most graphics systems. Low-end graphics adapters cannot render the polygon directly, so advanced software interpolation of the polygons is utilized to produce standard pixel data that then can be processed by the low-end graphics adapter. This process is referred to as rasterization. Unfortunately, most advanced graphics applications such as 3-D, scientific visualization, and real-time animation run much too slowly on such rasterization systems to provide acceptable performance.

Adapters of intermediate complexity use a variety of schemes to speed up the rasterization process, short of fully rendering the interiors of the polygons independently. Intermediate adapters are able to handle the interpolations of colors across a scan line, and can accept a mask indicating which pixels are to be updated and which are not (as a result of depth testing). However, this type of intermediate adapter does not perform interpolation of depth buffer values, so that depth interpolation must be done in software, which slows down the application. The reason that such intermediate adapters and the low-end adapters do not perform interpolation of depth buffer values is that the full floating-point addition required for the interpolation is too expensive to include with these less-expensive graphics adapters. Thus, when an image polygon has depth values associated with it, the user application is forced to do the interpolation and generate all the individual pixels, resulting in a slow application.

It can be seen that it would be desirable to provide a method of performing a fast interpolation of depth buffer values in hardware without using full floating-point operations. Such a method would enable less sophisticated and expensive hardware to be used with low-end and intermediate adapters. This hardware would be appropriate for implementation on depth-buffer-capable memory controllers that send entire spans of polygons to the graphics adapter and would make low-end and intermediate adapters much more useful for 3-D applications, since the conversion to pixels would occur in hardware, instead of the much slower software.

SUMMARY OF THE INVENTION

A graphics system that performs fast interpolation of depth buffer values is provided within a host data processing system that includes a host processor executing a graphics application having graphics data that includes depth data, and a graphics adapter that receives display pixel data, including a depth buffer value for each pixel, and that converts the display pixel data to output signals for driving an output display device. The graphics system comprises a memory/graphics controller that converts graphics data to pixel data, wherein the memory/graphics controller includes means for receiving an initial depth buffer value from the host processor in a floating-point format having a sign bit, an exponent and a mantissa, means for generating an accumulator value from the mantissa, means for receiving a delta depth value from the host processor, means for performing an integer addition of the accumulator value to the delta depth value to produce a sum, and means for generating a floating-point depth buffer value for a display pixel from the sum, the sign bit and the exponent of the initial depth value for output to the graphics adapter. The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
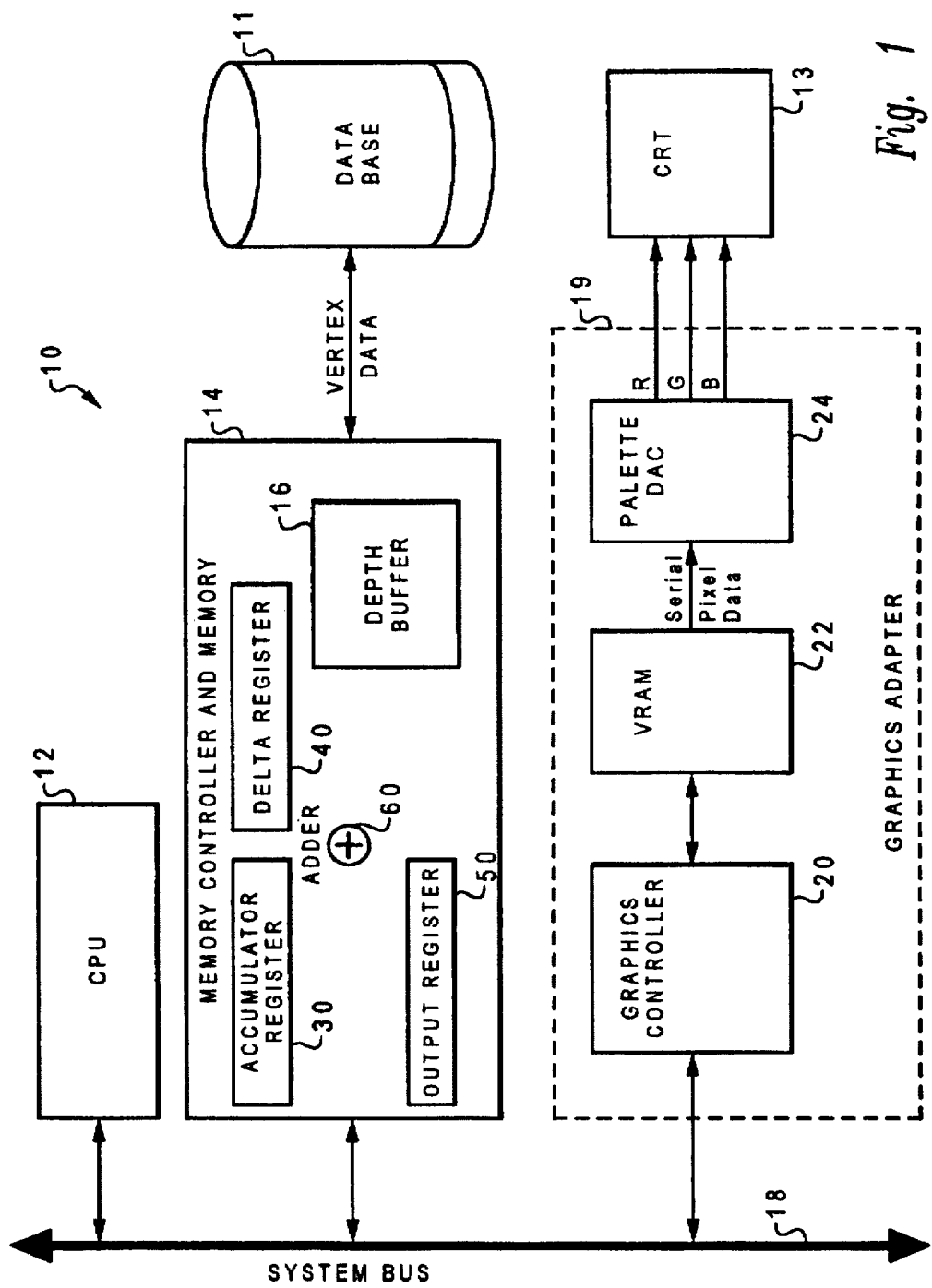
FIG. 1 shows a data processing system that performs a fast interpolation of depth buffer values for providing a graphics display of advanced graphics information particularly 3-D, on a two-dimensional display screen, in accordance with the present invention.

With reference to the figures, and in particular, with reference to FIG. 1, there is shown a data processing system that performs a fast interpolation of depth buffer values for providing a graphics display of advanced graphics information, particularly 3-D, on a two-dimensional display screen, in accordance with the present invention. A host data processing system, shown generally at 10, receives vertex data (graphics data) from a suitable database 11, which would be embodied in a disk drive or CD-ROM drive for example, that defines an overall image which is to be displayed as a three-dimensional image form on a cathode ray tube (CRT) raster display screen 13, which displays two dimensionally. The host data processing system 10 may include, for example, a host processor or central processing unit (CPU) 12, memory controller 14, and graphics adapter 19, each of which is connected to system bus 18 for transferring instructions and data between connected devices.

The host processor or central processing unit (CPU) 12 executes a graphics application program that derives images from the image data in database 11. Memory controller 14 controls access to database 11 by the graphics application, and has specialized graphics processing capabilities for generating display pixel data describing the location, color, and intensity of each point which makes up the overall image which is to be displayed. Memory controller 14 comprises registers 30, 40, 50, adder 60, and a depth buffer 16 storing depth buffer values defining the depth relationships of the array of pixels that form the overall image (memory controller 14 may also store stencil and transparency data). Memory controller 14 transfers the generated display pixel data to graphics adapter 19, which comprises graphics controller 20, video random access memory (VRAM) 22, and Palette DAC 24, to process the pixels for display on a 2-D raster display (CRT 13). Graphics controller 20 receives the pixel data, and transmits display pixel data, addressing information, and control signals to update graphics memory (VRAM) 22. VRAM 22 provides serial pixel data on a serial data bus to Palette DAC ("RAMDAC") 24. Palette DAC 24 processes the received display pixel data and converts it into analog signals (RGB signals) that drive the attached display device 13 for presentation as a visual image.

Host data processing system 10 displays a 3-D graphic image by painting a large number of polygons on the screen to construct a complicated object. The vertex data for each polygon has coordinate values (x, y), colors (r, g, b), and depth values (z) associated with each vertex. The vertex data is transferred to memory controller 14 from database 11.

The host data processing system 10 normally performs a number of functions, including "viewing transformation" of data representing the geometry of an image into data that provides for an appropriate scaling of the image or for rotational movement of the image, or for an enlargement of different regions of the image. The host data processing system 10 further provides for a "volume clipping" operation to provide a selected region of an overall image to be displayed, a process sometimes referred to as "windowing." In the present invention, memory controller 14 performs viewing transformation that takes into account the view reference point (i.e., the position from which an object is to be viewed) and the prospective projection (i.e., the conversion from the object's 3-D coordinates to the screen's 2-D coordinates). Also taken into account in the image transformation is the relative distance or depth of an object in the window. The transformation will clip data outside of user-defined limits (i.e., objects beyond the farthest/nearest distance displayed) and will not render portions of objects covered by objects having closer depth values.

The depth data used in rendering the image is stored in a depth buffer 16, and the color and intensity data is stored directly in a memory controller frame buffer, whereas color index data in the frame buffer which is used to address the desired color and intensity is stored in a color look-up table. The depth buffer 16 holds depth values which define the depth relationships among the points that form the image. As pixel data is transferred to graphics controller 16 for filling a frame buffer in VRAM 22 with the pixels of a particular polygon, memory controller 14 performs a comparison on a pixel-by-pixel basis between the depth value of each pixel in the polygon with the depth value of the pixel having the same x,y coordinate that has previously been loaded into the frame buffer. If the polygon pixel being loaded into the frame buffer has a closer depth value, the corresponding overlapped pixel is overwritten by the data representing the pixel from the polygon being loaded. This is done on a pixel-by-pixel basis such that the Z depth of each pixel controls whether the pixel will be displayed. That is, polygons and edges which are deeper, in space (i.e., farther away from the viewpoint of the observer), may be obscured by other polygons which are closer to the observer and which lie in the line of sight and viewpoint of the observer to the deeper polygon.

As pixel data is generated from the vertex data, the depth values of pixels along a particular span of a polygon being displayed have to be interpolated from the vertex data to form the pixels along the span. A span is a section of a horizontal scan line from one edge (or vertex) to the opposite edge of the polygon being displayed. The calculation of depth values for the span pixels is carried out by interpolation. This is done by calculating the Z coordinate of the pixels at each end of a raster scan line where it intersects the edges of a polygon. Then, the Z depth of individual pixels along the raster scan line are calculated by linear interpolation between the Z depths of the pixels at the intersections between the raster scan line and the edges of the polygon.

Figure 2:
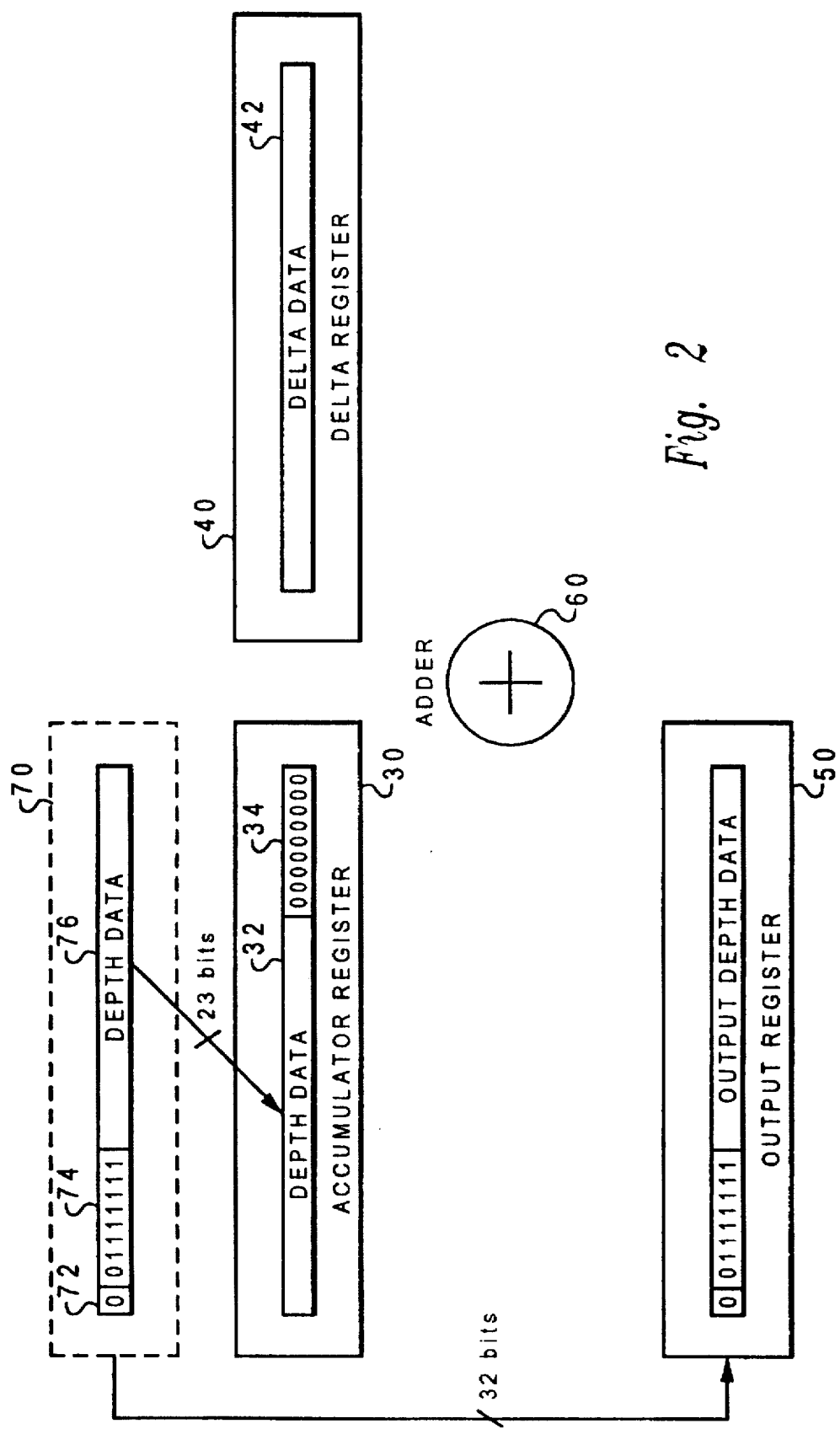
FIG. 2 shows a more detailed drawing of the memory controller of the present invention that performs a fast interpolation of depth buffer values along a span of a polygon to properly render display pixel data to a graphics adapter in accordance with the preferred embodiment of the present invention.

Referring now to FIG. 2, there is shown a more detailed drawing of the memory controller 14 that performs a fast interpolation of depth buffer values along a span of a polygon to properly render display pixel data to graphics adapter 19, in accordance with the preferred embodiment of the present invention. Memory controller 14 comprises an accumulator register 30, delta register 40, output register 50, and adder 60. An initial depth buffer value 70 for the first pixel along the edge of the span to be rendered is retrieved from the depth buffer. It is standard that depth buffer values are represented by single-precision floating-point numbers represented in the ANSI-IEEE Standard 754-1985 for binary floating-point arithmetic. According to the standard, the single-precision floating-point depth buffer value 70 will have a sign bit 72, eight-bit exponent 74, and a 32-bit fraction representing the mantissa depth data 76.

As taught in the prior art, the depth interpolation was performed by processing this full floating-point depth buffer value with a full floating-point depth buffer delta value, which indicates the linear difference of pixel-to-pixel depths. The high-end graphics adapters would perform the depth interpolation in hardware by utilizing expensive floating-point registers and floating-point adders. The low-end graphics adapters forced the depth interpolation to be performed in software using the full floating-point depth buffer values, thereby affecting graphics performance. The present invention provides a method of organizing the depth buffer and the interpolating delta information so that a modified floating-point addition can be performed. This modified operation is much simpler and faster than a full floating-point addition. This allows the conversion of pixels to occur in less expensive hardware, instead of the much more expensive hardware or slower software. This method is implemented on a depth-buffer-capable memory controller of the present invention that can quickly and inexpensively generate an entire span of a polygon to be sent the graphics adapter. As a result, the graphics-capable memory controller of the present invention provides a high-performance, low-cost capability for displaying 3-D applications through a 2-D graphics adapter.

According to one aspect of the present invention, the allowable range of depth values are restricted to the range of 1.0 to 2.0 (actually, just a small epsilon less than 2.0). Thus, while an application can use depth values in various ranges, for example, 0.0 to 100.0 or −1.0 to 1.0, memory controller 14 will remap the floating-point depth buffer values to the range of 1.0 to 2.0 before loading the depth values in the depth buffer. The benefit that accrues from this choice of a depth buffer range is that the IEEE floating-point representation of all numbers in this range share the same exponent value. Consequently, this exponent never has to be checked, and never has to be modified during the depth interpolation and, as will be explained and appreciated hereinafter, this aspect of the present invention provides for substantial simplification of the hardware necessary to perform depth interpolation.

Therefore, in accordance with the first aspect of the present invention, the 32-bit initial depth buffer value 70 must be restricted to the range between 1.0 and 2.0. Sign bit 72 is always a zero, which represents a positive number under the IEEE Floating-Point Format. Also, according to the IEEE format, the value of the exponent bias is 127 for 32-bit numbers, so the 8-bit exponent 74 must be set to "01111111" to represent zero in "Excess-127" notation. The remaining 23-bits of initial depth buffer value 70 form the mantissa (DEPTH DATA 76), or fraction, of initial depth buffer value 70. The IEEE standard assumes a normalized mantissa with a value between $1.000\ldots0_2$ and $1.111\ldots1_2$; because the leading bit (representing the value 1) is always present, the IEEE standard elides it from the representation. Therefore, it will be appreciated that regardless of the value of DEPTH DATA 32, the depth buffer value will always be between 1.0 and 2.0 (actually, 1.0 to 2.0 minus $2^{-23}$).

Referring back to FIG. 2, the 23 bits of DEPTH DATA 76 is loaded into the top 23 bits (DEPTH DATA 32) of accumulator register 30. The remaining lower 9 bits 34 of the 32-bit accumulator register 30 are reset to zero. Also, the entire 32-bit initial depth buffer value 70 is loaded into output pixel register 50. According to another aspect of the present invention, delta register 40 is loaded with a delta value for the current span being interpolated that has a custom-made format for utilization in the memory controller of the present invention. When a span of a polygon is to be painted, the depth values for the pixels and the spans of the polygon change linearly across each span. This per-pixel change is referred to as the delta value for the depth calculations. The delta value is precomputed by the displaying application and provided to the memory controller. The delta value is a 32-bit number in a 2's-complement representation of a fraction whose value can range from −1.0 to +0.999999. Delta value 42 (DELTA DATA) is the 32-bit mantissa of this delta value (in IEEE format); the sign bit and exponent are purposefully not included in the delta value. The additional 9 bits add more precision to minimize round-off error. Because the sign bit is not included, a delta value has two possible values (positive or negative), but only one of these values can be the correct delta value. For example, "$C00000_{16}$" can represent either 0.75 or −0.25. Since we guarantee that the delta value cannot take a depth value out of the predefined range of 1.0 to 2.0, the hardware will automatically select the correct value of delta data 42 because, as explained below, the overflow/underflow conditions in adder 60 are ignored.

Figure 3:
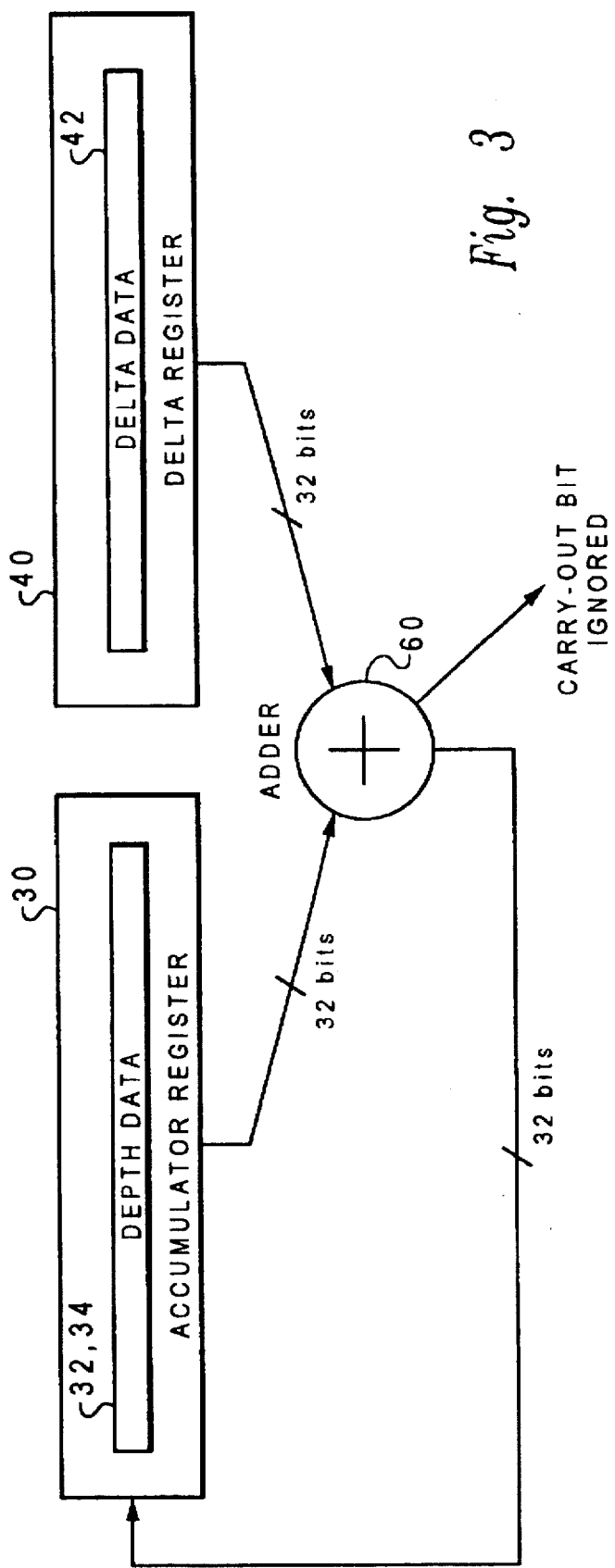
FIG. 3 shows the accumulator value being added to the delta value to perform the first interpolation to calculate the depth buffer value for the next pixel along the span in accordance with the preferred embodiment of the present invention.

To perform the first interpolation to calculate the depth buffer value for the next pixel along the span, the accumulator value is added to the delta value as shown in FIG. 3. The 32-bit accumulator value 32, 34 is added to the 32-bit delta value 42 by fixed-point 32-bit adder 60. The 32-bit sum of this addition is loaded back into accumulator register 30. As will be appreciated by those skilled in the art, the modified values for the accumulator value and delta value provide an integer representation of these values that allow the interpolation addition to be performed quite rapidly with much less complexity than is needed to perform an add operation between the two full IEEE floating-point depth buffer and delta values. Both numbers are added in 2's-complement format and any carry-out bit from adder 60 is discarded, so that the correct delta value 42 is added to the accumulator of value 22 to produce a new accumulator value still within the required range of 1.0 to 2.0.

Figure 4:
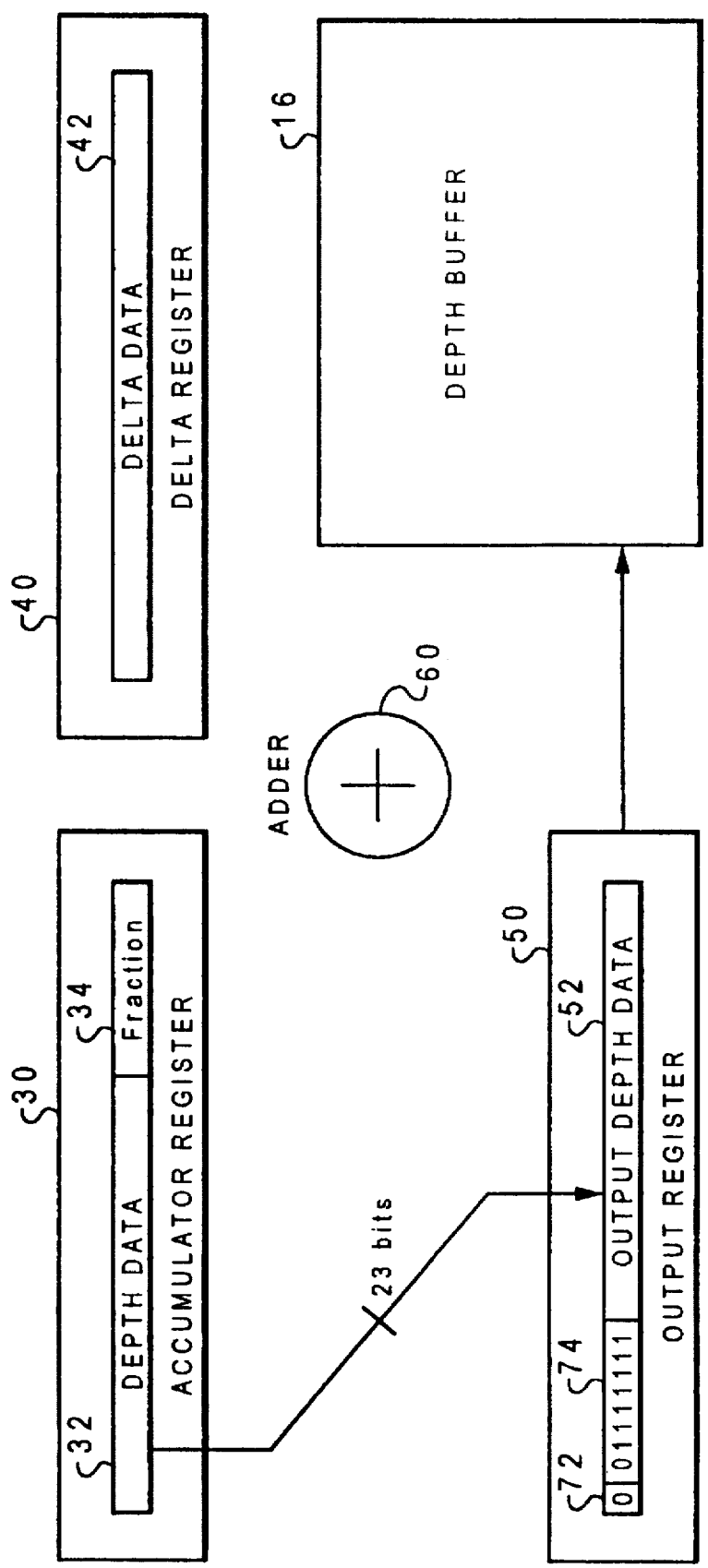
FIG. 4 shows the completion of the depth interpolation of the pixel data by storing the pixel's depth value in floating-point representation in the depth buffer in accordance with the preferred embodiment of the present invention.

As seen in FIG. 4, the depth interpolation of the pixel data is completed by storing the pixel's depth value in floating-point representation in the depth buffer. This is accomplished by copying the DEPTH DATA 32, which comprises the upper 23 bits of the 32-bit accumulator value 32, 34 into the lower 23 bits of output register 30, thereby overwriting the initial DEPTH DATA 76 of the initial depth buffer value 70, which had previously been loaded into output register 50. The 9-bit fraction 34 is merely dropped from the mantissa precision. Thereafter, the entire 32-bits of output register 50, including sign bit 72, exponent 74, and OUTPUT DEPTH DATA 52, can be stored out to the depth buffer 16 as a 32-bit floating-point depth value for the next pixel on the span being interpolated. Because the exponent and sign of each depth value is always the same for all depth values, the exponent and sign of an interpolated depth value never has to be checked, and never has to be modified during the depth interpolation.

As will be appreciated, the next subsequent pixel along the span is then interpolated using the above described process. The delta value 42 remains the same along the entire span, and so delta register 40 is not reloaded. Additionally, accumulator register 30 retains the accumulator value 32, 34 that was stored from the interpolation addition for the previous pixel. Therefore, the next step of the interpolation is performed by adding the accumulator value 32, 34 to the delta value 42 in adder 60 and the sum loaded back into accumulator register 30, as seen in FIG. 3.

Thereafter, DEPTH DATA 32, consisting of the first 23 bits of accumulator register 30, is copied to override OUTPUT DEPTH DATA 52 at the lower 23 bits of output register 50. The entire contents of 32-bit output register 30 is then stored to the depth buffer 16 as the 32-bit floating-point depth buffer value for the next pixel along the span. These steps of adding accumulator value 32, 34 to delta value 42, overriding the 23 bits of output register 50 with the upper 23 bits of accumulator register 30, and then outputting the contents of output register 50 to the depth buffer 16 as the next pixel's depth buffer value is repeated across the entire span of pixels being interpolated. When the depth interpolation of the span has completed, the depth interpolation of a new span is initiated by loading the initial depth buffer value 70 for that span into output register 30 and storing the lower 23 bits of this initial depth buffer value in the upper 23 bits of accumulator register 30, and the entire depth interpolation process is repeated.

Figure 5:
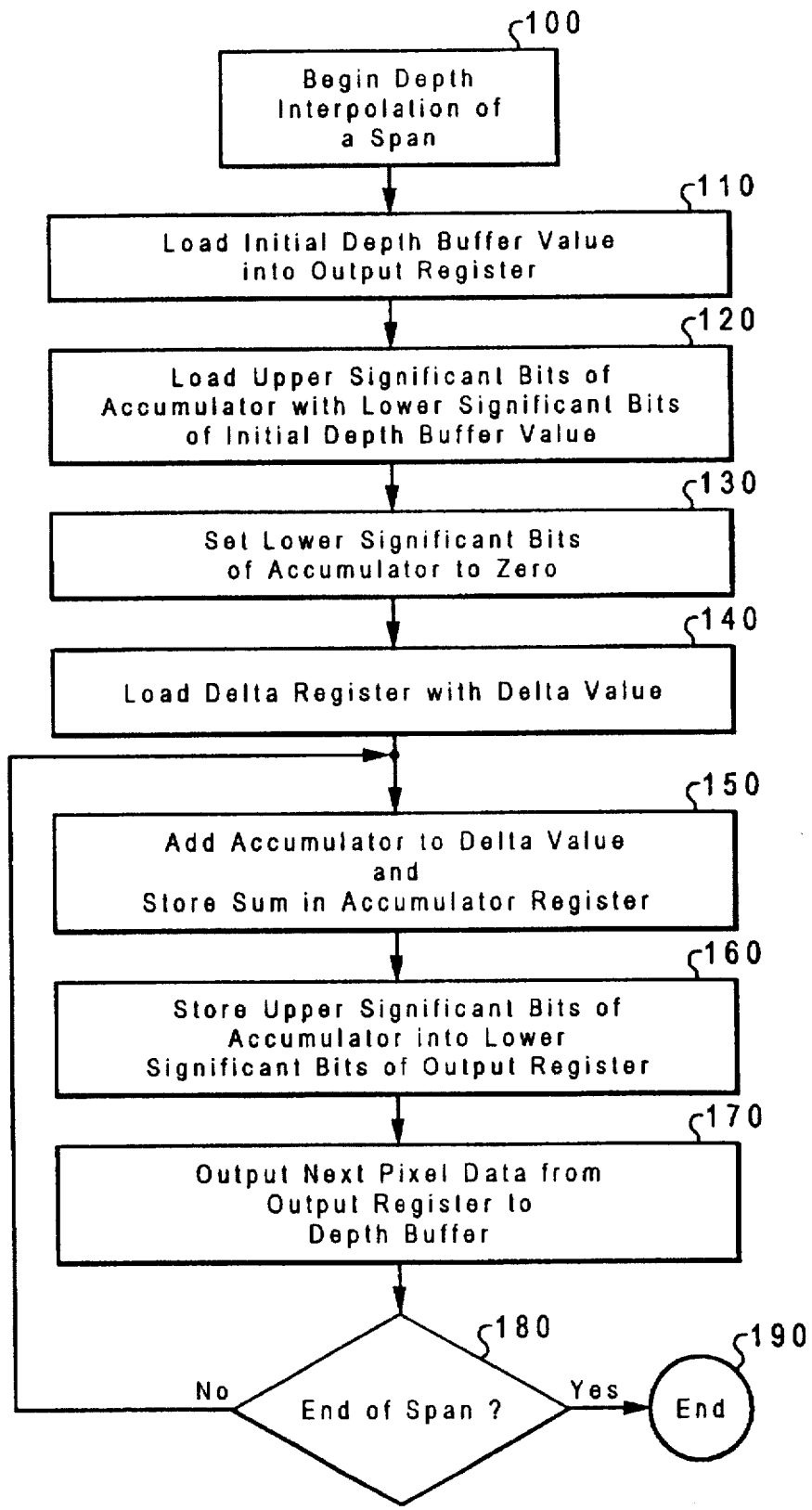
FIG. 5 shows a flow diagram of the method of fast interpolation of depth buffer values in accordance with the preferred embodiment of the present invention.

Referring now to FIG. 5, there is shown a flow diagram of the method of fast interpolation of depth buffer values in accordance with the preferred embodiment of the present invention. The process begins at step 100 when depth interpolation of a polygon span is initiated in memory controller 14. The initial depth buffer value for the first pixel in the span is received from the vertex database 11 and loaded into the output register in its floating-point format, at step 110. Memory controller 14 has required that all depth buffer values be in the range from 1.0 to 2.0, or alternatively, has remapped the provided range of depth values to that range.

At step 120, the upper 23 significant bits of the accumulator register are also loaded from the initial depth buffer value by copying the lower 23 bits, which completely identifies the depth value of the initial pixel since the sign and exponent must remain the same into the upper 23 bits of the accumulator register. The remaining 9 lower significant bits in the 32-bit accumulator register are simultaneously set to zero at step 130, or this step may be skipped if the accumulator register is initialized by resetting all bits to zero.

The delta value is reported to the memory controller by the application program. The delta value is remapped to the range of −1.0 to +0.999999 to produce a 32-bit 2's-complement fraction, without including a sign bit, and then the delta value is loaded into the delta register, at step 140.

At step 150, the accumulator value stored in the accumulator register is added to the delta value in the delta register by a 32-bit integer adder. The sum of this addition is then stored in the accumulator register, overriding the previous accumulator value. At step 160, the 23 upper significant bits of the accumulator value is stored into the 23 lower significant bits of the output register, overriding the initial depth buffer value depth data. The 32-bit contents of the output register, consisting of the unchanged sign bit and exponent previously loaded from the initial depth buffer value and the upper significant bits of the accumulator value, becomes the output pixel data for the next pixel in this span. This output pixel data is stored to the depth buffer as the depth buffer value for the next output pixel, at step 170.

At decision block 180, it is determined whether the end of the span has been reached and the depth interpolation for every pixel in the span has been performed. If so, the process ends at block 190. If the end of the span has not been reached, the process returns to step 150, where the accumulator value for the previous pixel is added to the delta value and the sum is stored as a new accumulator value for this next pixel. The 23 upper significant bits of this new accumulator value are stored to the 23 lower significant bits of the output register at step 160 to form a depth buffer value for this pixel; it is stored out to the depth buffer at step 170. The process then proceeds to step 180 where it is again determined whether the end of the span has been reached. This process is repeated until all pixels across the entire span of the polygon have been interpolated and the depth buffer for that span has been filled. Thereafter, the process ends at step 190.

It can be seen that it would be desirable to provide a method of performing a fast interpolation of depth buffer values without using full floating-point operations. Such a method would enable less sophisticated and expensive hardware to be used with low-end and intermediate adapters. This hardware would be appropriate for implementation on depth-buffer-capable memory controllers that send entire spans of polygons to the graphics adapter and would make low-end and intermediate adapters much useful for 3-D applications, since the conversion to pixels would occur in hardware, instead of the much slower software.

In summary, according to one aspect of the present invention, the allowable range of depth values are restricted to the range of 1.0 to 2.0 (actually, just a small epsilon less than 2.0). Consequently, this exponent never has to be checked, and never has to be modified during the depth interpolation and, as will be explained and appreciated hereinafter, this aspect of the present invention provides for substantial simplification of the hardware necessary to perform depth interpolation. Another aspect of the present invention provides a method of organizing the depth buffer and the interpolating delta information so that a modified floating-point addition can be performed using an integer adder. This modified operation is much simpler and faster than a full floating-point addition because it is performed by the integer adder. This allows the conversion of pixels to occur in less expensive hardware, instead of the much more expensive hardware or slower software. The present invention is implemented on a depth-buffer-capable memory controller of the present invention that can quickly and inexpensively generate an entire span of a polygon to be sent the graphics adapter. As a result, the graphics-capable memory controller of the present invention provides a high-performance, low-cost capability for displaying 3-D applications through a 2-D graphics adapter. Thus, the depth interpolation of the present invention is particularly valuable in 3-D, Scientific Visualization, Computer Animation, and Digital Video applications.

While the invention has been particularly shown and described with reference to a preferred embodiment, it will be understood by those skilled in the art that various changes in form and detail may be made therein without departing from the spirit and scope of the invention.

What is claimed is:

1. A method for fast interpolation of depth buffer values in a graphics system, the method comprising the steps of:
   receiving an initial depth buffer value in a floating-point format having a sign bit, an exponent and a mantissa;
   generating an accumulator value utilizing, among the sign bit, the exponent, and the mantissa, only the mantissa;
   receiving a delta depth value;
   performing an integer addition of the accumulator value to the delta depth value to produce a sum;
   generating a depth buffer value for a display pixel from the sum, and the sign bit and exponent of the initial depth buffer value.

2. A method for fast interpolation of depth buffer values in a graphics system according to claim 1, further comprising the steps of adding the delta depth value to the sum to produce a new sum, and generating a depth buffer value for a next display pixel from the new sum, and the sign bit and exponent of the initial depth value.

3. A method for fast interpolation of depth buffer values in a graphics system according to claim 1, wherein any carry bit in the sum greater than the most significant bit of the delta depth value is subtracted from the sum prior to generating the depth buffer value for the display pixel.

4. A method for fast interpolation of depth buffer values in a graphics system according to claim 1, wherein the delta depth value is derived from a floating-point delta depth value.

5. A method for fast interpolation of depth buffer values in a graphics system according to claim 1, wherein the accumulator value is generated from the mantissa and additional bits.

6. A method for fast interpolation of depth buffer value in graphics system according to claim 1, wherein the accumulator value has one or more upper significant bits and one or more lower significant bits, and wherein the step of generating an accumulator value comprise concatenating the mantissa as the upper significant bits of the accumulator value with one or more zero as the significant bits of the accumulator value.

7. A method for fast interpolation of depth buffer values in a graphics system according to claim 1, wherein the step of generating a depth buffer value comprises concatenating the sign bit and the exponent of the initial depth buffer value with the sum to form a floating-point depth buffer value.

8. A method for fast interpolation of depth buffer values in a graphics system according to claim 7, wherein the sum has one or more lower significant bits and wherein the lower significant bits are subtracted from the sum such that the floating-point depth buffer value has a number of bits equal to the number of bits in the initial depth buffer value.

9. A method for fast interpolation of depth buffer values in a graphics system according to claim 1, wherein a depth buffer value can only be between a first number that is a power of two and a second number that is the next greater power of two.

10. A method for fast interpolation of depth buffer values in a graphics system according to claim 1, wherein the initial depth buffer, the accumulator value and the delta depth value are 32 bits each.

11. A graphics system that performs fast interpolation of depth buffer values, comprising:
    means for receiving an initial depth buffer value in a floating-point format having a sign bit, an exponent and a mantissa;
    means for generating an accumulator value utilizing, among the sign bit, the exponent and the mantissa, only the mantissa;
    means for receiving a delta depth value;
    means for performing an integer addition of the accumulator value to the delta depth value to produce a sum;
    means for generating a depth buffer value for a display pixel from the sum, the sign bit and the exponent of the initial depth buffer value.

12. A graphics system that performs fast interpolation of depth buffer values according to claim 11, further wherein the means add the delta depth value to the sum to produce a new sum, and generate a depth buffer value for a next display pixel from the new sum, and the sign bit and exponent of the initial depth value.

13. A graphics system that performs fast interpolation of depth buffer values according to claim 11, further comprising means wherein any carry bit in the sum greater than the most significant bit of the delta depth value is subtracted from the sum prior to generating the depth buffer value for the display pixel.

14. A graphics system that performs fast interpolation of depth buffer values according to claim 11, further comprising means wherein the accumulator value is generated from the mantissa and additional bits.

15. A graphics system that performs fast interpolation of depth buffer values according to claim 11, wherein the accumulator value has one or more upper significant bits and one or more lower significant bits, and wherein the means for generating an accumulator value further comprises means for concatenating the mantissa as the upper significant bits of the accumulator value with one or more zeros as the lower significant bits of the accumulator value.

16. A graphics system that performs fast interpolation of depth buffer values according to claim 11, wherein the means for generating a depth buffer value comprises means for concatenating the sign bit and the exponent of the initial depth buffer value with the sum to form a floating-point depth buffer value.

17. A graphics system that performs fast interpolation of depth buffer values according to claim 16, wherein the sum has one or more lower significant bits and wherein the lower significant bits are subtracted from the sum by said means for generating a depth buffer value such that the floating-point depth buffer value has a number of bits equal to the number of bits in the initial depth buffer value.

18. A graphics system that performs fast interpolation of depth buffer values according to claim 11, wherein a depth buffer value can only be between a first number that is a power of two and a second number that is the next greater power of two.

19. A graphics system that performs fast interpolation of depth buffer values according to claim 11, wherein the initial depth buffer value, the accumulator value and the delta depth value are 32 bits each.

20. A graphics system that performs fast interpolation of depth buffer values according to claim 11, wherein both means for receiving are registers.

21. A graphics system that performs fast interpolation of depth buffer values according to claim 11, wherein the means for adding is a 32 bit adder.

22. A graphics system that performs fast interpolation of depth buffer values, comprising:

a host processor executing a graphics application having graphics data that includes depth data;

a controller that converts graphics data to pixel data, wherein the controller includes:

means for receiving an initial depth buffer value from the host processor in a floating-point format having a sign bit, an exponent and a mantissa;

means for generating an accumulator value utilizing, among the sign bit, the exponent, and the mantissa, only the mantissa;

means for receiving a delta depth value from the host processor;

means for performing an integer addition of the accumulator value to the delta depth value to produce a sum; and means for generating a floating-point depth buffer value for a display pixel from the sum, the sign bit and the exponent of the initial depth buffer value; and a graphics adapter that receives display pixel data from the controller, including a depth buffer value for each pixel, and that converts the display pixel data to output signals for driving an output display device.

23. A graphics system that performs fast interpolation of depth buffer values according to claim 22, further wherein the means add the delta depth value to the sum to produce a new sum, and generate a depth buffer value for a next display pixel from the new sum, and the sign bit and exponent of the initial depth value.

24. A graphics system that performs fast interpolation of depth buffer values according to claim 22, further comprising means wherein any carry bit in the sum greater than the most significant bit of the delta depth value is subtracted from the sum prior to generating the depth buffer value for the display pixel.

25. A graphics system that performs fast interpolation of depth buffer values according to claim 22, further comprising means wherein the accumulator value is generated from the mantissa and additional bits.

26. A graphics system that performs fast interpolation of depth buffer values according to claim 22, wherein the accumulator value has one or more upper significant bits and one or more lower significant bits, and wherein the means for generating an accumulator value further comprises means for concatenating the mantissa as the upper significant bits of the accumulator value with one or more zeros as the lower significant bits of the accumulator value.

27. A graphics system that performs fast interpolation of depth buffer values according to claim 22, wherein the means for generating a depth buffer value comprises means for concatenating the sign bit and the exponent of the initial depth buffer value with the sum to form a floating-point depth buffer value.

28. A graphics system that performs fast interpolation of depth buffer values according to claim 27, wherein the sum has one or more lower significant bits and wherein the lower significant bits are subtracted from the sum by said means for generating a depth buffer value such that the floating-point depth buffer value has a number of bits equal to the number of bits in the initial depth buffer value.

29. A graphics system that performs fast interpolation of depth buffer values according to claim 22, wherein a depth buffer value can only be between a first number that is a power of two and a second number that is the next greater power of two.

30. A graphics system that performs fast interpolation of depth buffer values according to claim 22, wherein the initial depth buffer value, the accumulator value and the delta depth value are 32 bits each.

31. A graphics system that performs fast interpolation of depth buffer values according to claim 22, wherein both means for receiving are registers.

32. A graphics system that performs fast interpolation of depth buffer values according to claim 22, wherein the means for adding is a 32 bit adder.

* * * * *